United States Patent
Koul (10) Patent No.: US 9,182,947 B2
(45) Date of Patent: Nov. 10, 2015

(54) PROGRAM SOURCE CODE NAVIGATION

(71) Applicant: International Business Machines Corporation, Armonk, NY (US)

(72) Inventor: Ankush Koul, Jammu (IN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 13/911,118

(22) Filed: Jun. 6, 2013

(65) Prior Publication Data

US 2014/0365998 A1 Dec. 11, 2014

(51) Int. Cl.
*G06F 9/44* (2006.01)

(52) U.S. Cl.
CPC ........................................ *G06F 8/33* (2013.01)

(58) Field of Classification Search
CPC ...................................... G06F 8/31; G06F 8/33
USPC .................................................. 717/110–119
See application file for complete search history.

(56) References Cited

U.S. PATENT DOCUMENTS

| 7,373,634 | B2 * | 5/2008 | Hawley et al. ................. 717/110 |
| 7,614,035 | B2 | 11/2009 | DeLine |
| 2007/0277149 | A1 | 11/2007 | Stevens |

FOREIGN PATENT DOCUMENTS

| KR | 100877156 B1 | 1/2009 |
| KR | 101136457 B1 | 4/2012 |

OTHER PUBLICATIONS

Jon Sayles, "Introduction to Rational Developer for System z for ISPF Developers", 2010, IBM Software Group, 206 pages.*
Scott Morrell, "Expediting SQL Development in ISPF—Cool Things We Did", 2009, Florida Hospital, 39 pages.*
kde.org, "KDevelop Handbook—Table of Contents", Aug. 2012, retrieved from https://docs.kde.org/stable/en/extragear-kdevelop/kdevelop/index.html, 2 pages.*
Gfesser, Erik, "NVISIA—Open source code navigator", posted on Oct. 15, 2008 at 1:32 pm, filed under Java & Open Frameworks and tagged C#, COBOL, Code-Navigator, Java, Red Hat, Source-Navigator, tools, VB. <http://nvisia.com/techs/?p=80>.
"ATX / Application Modernization, Migration and Reeengineering / Other Solutions", <http://www.atxtechnologies.co.uk/other/development/cobolstudio/cobolstudio/>, Copyright © 2005-2013.
"Greg's source code navigation tools", <http://www.lemis.com/grog/software/source-code-navigation.php>, Jun. and Jul. 2005.
"Navigating Source Code", <http://supportline.microfocus.com/documentation/books/mx25sp1/ugnavi.htm>, Copyright © 2001 Micro Focus International Limited.
"Source Navigator", Updated Mar. 26, 2008 11:57:15 by LV, <http://wiki.tcl.tk/890>.

(Continued)

*Primary Examiner* — Ted T Vo
(74) *Attorney, Agent, or Firm* — Stephen R. Yoder (57) ABSTRACT

A computer determines a cursor location within source code displayed on a display screen. The computer determines a keyword based at least on the cursor location. The cursor location may include: line number, column number, designated non-word location, and/or reserved word. The computer takes an action based on the keyword including, but not limited to the following actions: jumping to the first occurrence of the keyword search term, extracting a COBOL copybook data set, and/or sending an EXPLAIN query to a database manager.

10 Claims, 6 Drawing Sheets

(56) References Cited

OTHER PUBLICATIONS

"Source navigator NG", <http://sourcenav.berlios.de/>, (c) 2012 by sourcenav NG development group.

"Navigating in source code", provided in Search Report dated Jan. 1, 2013, <http://docs.kde.org/development/en/extragear-kdevelop/kdevelop/navigating-in-source-code.html>.

* cited by examiner

PROGRAM SOURCE CODE NAVIGATION

FIELD OF THE INVENTION

The present invention relates generally to the field of software development tools, and more particularly to navigating source code.

BACKGROUND OF THE INVENTION

COBOL (COmmon Business-Oriented Language) is one of the oldest programming languages. The name is indicative of its primary domain, namely business, finance, and administrative systems for companies and governments. COBOL has an English-like syntax and structural elements including nouns, verbs, clauses, sentences, sections, and divisions. COBOL syntax is relatively verbose so that non-programmers, such as managers, supervisors, and users, can read and understand the code. However, the verbose nature of COBOL leads to time consuming navigation of numerous lines of code during program analysis.

During the analysis of a COBOL program, a user may be required to navigate the code by following branches and accessing external databases, only to return to the part of the code where the investigation began and navigate another path, or branch, of interest. The user generally navigates though various portions of the code including: (i) paragraph definitions; (ii) variable declaration statements; and (iii) SQL (structured query language) cursor declaration statements. The user will further view other source code including: (i) copybook source code; and (ii) declarations generator source code. Oftentimes, the user would like to enter a branch of the source code, view all possible sub-branches, for example, by means of a code editor's "find function" or other macros. When the branch and sub-branches are extensive or complex, the trail is difficult to track and trace using this approach.

SUMMARY

Embodiments of the present invention disclose a method, computer program product, and system for navigating programming source code from within a source code editor. A computer determines a cursor location within the source code displayed on a display screen. The computer determines a keyword based at least on the cursor location. The computer takes an action based on the keyword.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java and Smalltalk are trademarks of their respective owners. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the invention operate generally to display information relating to the content and structure of a source code document according to the context of the cursor location within the source code document when the document is being viewed in a code editor. Displaying information includes visually navigating forward and backward through the lines of code in the source code document, including logic branches, expanding source code references to called system library routines, and interfacing with systems, such as database managers and transaction processors, that are called within the source code.

Figure 1:
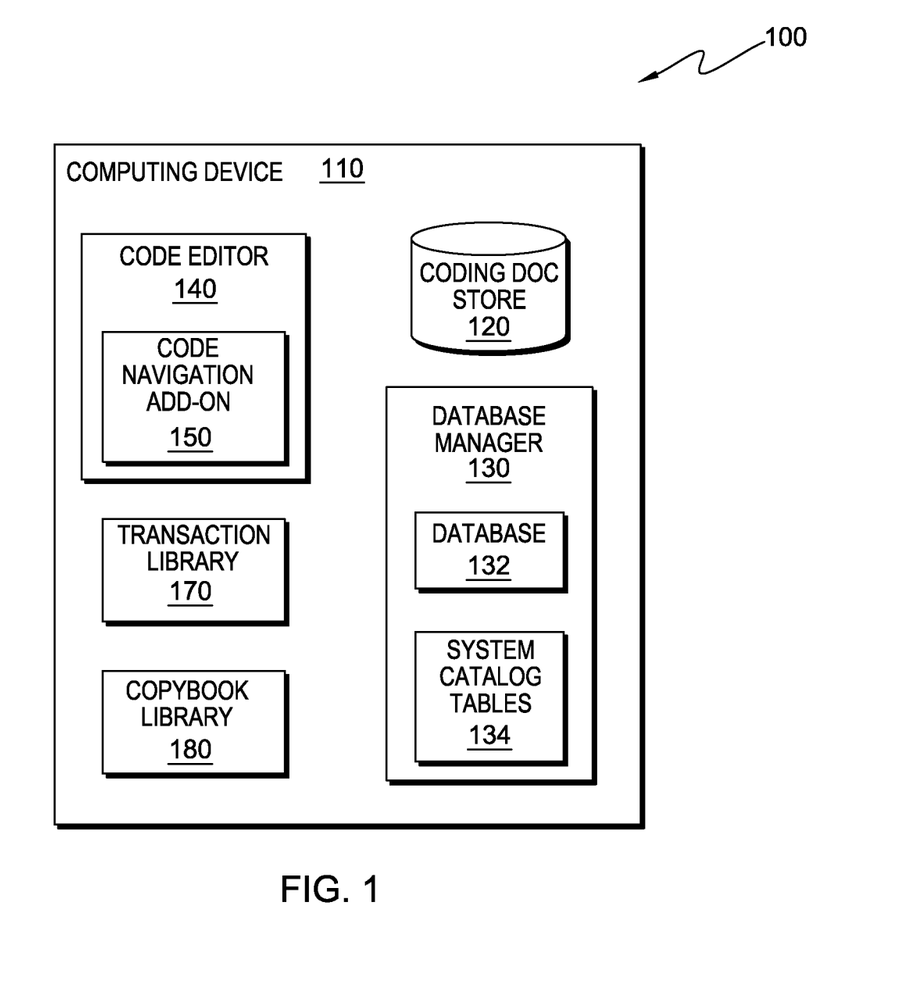
FIG. 1 is a functional block diagram of a code navigation system in accordance with an embodiment of the present invention.

The present invention will now be described in detail with reference to the figures. FIG. 1 is a functional block diagram of a code navigation system 100 in accordance with an embodiment of the present invention. Code navigation system 100 includes computing device 110, which further includes coding document store 120, database manager 130 and associated database 132 and system catalog tables 134, code editor 140 including code navigation add-on 150, transaction library 170, and copybook library 180.

In various embodiments of the invention, computing device 110 can be, for example, a mainframe or mini computer, a laptop computer, a netbook personal computer (PC), or a desktop computer. Code navigation system 100 is shown as being wholly implemented on computing device 110. However, code navigation system 100 may operate in a distributed environment in which one or more of its components are implemented across a plurality of computing devices that communicate over a network, such as a local area network (LAN) or a wide area network (WAN) such as the Internet. For example, database manager 130 may operate on a separate computing device having sufficient capabilities to support only the operation of the database manager. In general, code navigation system 100 can execute on any computing device 110, or combination of computing devices, satisfying desired implementation requirements, and as described in relation to FIG. 5.

Coding document store 120 represents physical storage, for example computer-readable storage media 508 (see FIG. 5), of source code documents to be analyzed or otherwise reviewed within code navigation system 100. Source code is generally made up of lines of code written in a structured programming language. Structured programming languages are typically organized in a particular layout, whether the layout is required or simply best practice. The lines of code are generally organized into sections or divisions. For example, the structured programming language COBOL includes divisions, sections, paragraphs, definitions, sentences, and statements, as identified in the source code by specific keywords. Some or all of these features may be present in a given program. Code navigation system 100 works with keywords in the source code to navigate to various portions of the source code. In some embodiments, keywords are identified to code navigation system 100 by placement of the cursor, or cursor location. Actual cursor placement varies according to program design. In some programs, the cursor covers a character space, that is, the cursor is at a character space. In other programs, the cursor does not occupy a character space, but is adjacent to a character space. In other embodiments, the keyword search terms are determined by code navigation system 100 based on cursor placement. Determination of the keyword search term is discussed in more detail below.

In a preferred embodiment, source code documents in coding document store 120 are written in the COBOL programming language. There are several available formats for COBOL. These formats may be summarized into three basic formats: (i) fixed, (ii) variable, and (iii) free. The preferred COBOL format is fixed, where the COBOL source code is divided into 72 columns. Fixed format COBOL is divided into four areas. The columns are used to define the four areas in the following way: (i) columns 1-6 are the sequence number area; (ii) column 7 is the indicator area; (iii) columns 8-11 are reserved as Area A; and (iv) columns 12-72 are reserved as Area B. Area A includes division headers, section headers, paragraph names, FD (file descriptor) statements, and Level 01 statements. Area B includes any other statements and sentences.

There may be several different divisions, sections, paragraphs, and so forth in a COBOL program. For example, in a typical COBOL program, there are at least four divisions: Identification, Environment, Data, and Procedure. The beginning of each division is identified by a "DIVISION" header statement identifying the division, and each division includes sections and statements specific to that division. For example, if there is a configuration section in the COBOL program, it will be found in the Environment Division.

Database manager 130 operates to access and retrieve data in database 132 in response to database calls from within programs executing source code contained in source code documents in coding document store 120. Database manager 130 also responds to requests regarding database performance, and the performance of specific queries or transactions or similar requests. Database manager 130 includes database 132, which may reside, for example, on computer-readable storage media 508 (see FIG. 5). In a preferred embodiment, database manager 130 is the DB2® relational database management system. In preferred embodiments of the invention, coding document store 120 includes at least one COBOL language source code document for a program to access the data in database 132 via database manager 130.

System catalog tables 134 consist of tables and views that describe the structure of database 132. Sometimes called the data dictionary, these table objects contain everything database 132 knows about itself. Each system catalog table contains information about specific elements in the database.

Each database has its own system catalog. System catalog tables 134 may consist of metadata in which definitions of database objects such as base tables, views (virtual tables), synonyms, value ranges, indexes, users, and user groups are stored.

Examples of tables in DB2® system catalog tables are the statement table, the predicate table, and the plan table. Information about the access plan chosen for a supplied explainable statement is loaded into the system catalog tables 134 and accessed by EXPLAIN query sub-module 200 (see FIG. 3).

In a preferred embodiment, transaction library 170 contains Customer Information Control System (CICS) transactions that may be invoked by the source code being analyzed. CICS is a trademark of International Business Machines, Inc. A CICS transaction is a transaction routine initiated by a single request that may affect one or more objects. The source code may simply invoke a transaction by name instead of including the code for the transaction. In such an environment, the transaction library acts as a store for transaction routines.

Copybook library 180 is a dataset or a library of datasets that contain sections of code, or copybooks, written in a high-level programming language or assembly language that can be copied from the library and inserted into different programs or multiple places in a single program during program compilation. A copybook is often used to define the physical layout of program data, pieces of procedural code and prototypes. In COBOL, information from copybook libraries is inserted into a program via a COPY statement.

In preferred embodiments of the invention, code navigation by a user is accomplished through code editor 140, in which lines of source code are displayed as a working copy for editing and analysis. Code editor 140 is a text editor program that operates generally as a user interface providing access to source code documents stored in coding document store 120. Some code editors are specifically designed for editing source code of computer programs. Other general purpose text editor programs can be used to edit source code. The code editor may be a standalone application or it may be built into an integrated development environment. Whether a specialized code editor or a multi-purpose text editor, code editor 140 displays editable text in source code documents stored in coding document store 120, identifies the position of cursor placement within the text of the source code document being displayed, and is compatible with third party programs and add-ons designed to edit and scroll through lines of code, such as code navigation add-on 150.

In a preferred embodiment, code editor 140 is ISPF (Interactive System Productivity Facility by International Business Machines Corporation). ISPF provides a command line on the code editor screen where commands can be entered. There is a six character line number field in the leftmost column with the remainder of the screen width being filled with the records of the source code document, or dataset, being edited, for example, a source code document from coding document store 120. Line commands such as "insert" and "delete" may be entered by over-typing in the line number field.

Code navigation add-on 150 is included in code editor 140. Code navigation add-on 150, the operation of which is described in more detail below, operates generally to display information according to the context of the cursor location, or cursor context, in the source code; to traceably navigate source code in a source code document in coding document store 120; and to enhance source code analysis through, for example, copybook extraction and database query statement analysis. In a preferred embodiment, code navigation add-on 150 operates as an "add-on" to code editor 140 that can be activated by pressing a function key, for example, the "F6" key, as needed by a user of code editor 140. In other embodiments, code navigation add-on 150 can be integral to code editor 140, for example, as a feature included within code editor 140.

Embodiments of the invention are described with respect to the components and their functionality as presented in FIG. 1. Other embodiments of the invention may perform the invention as claimed with different functional boundaries between components. For example, the functionality of code navigation add-on 150 may be implemented as a standalone component.

Figure 2:
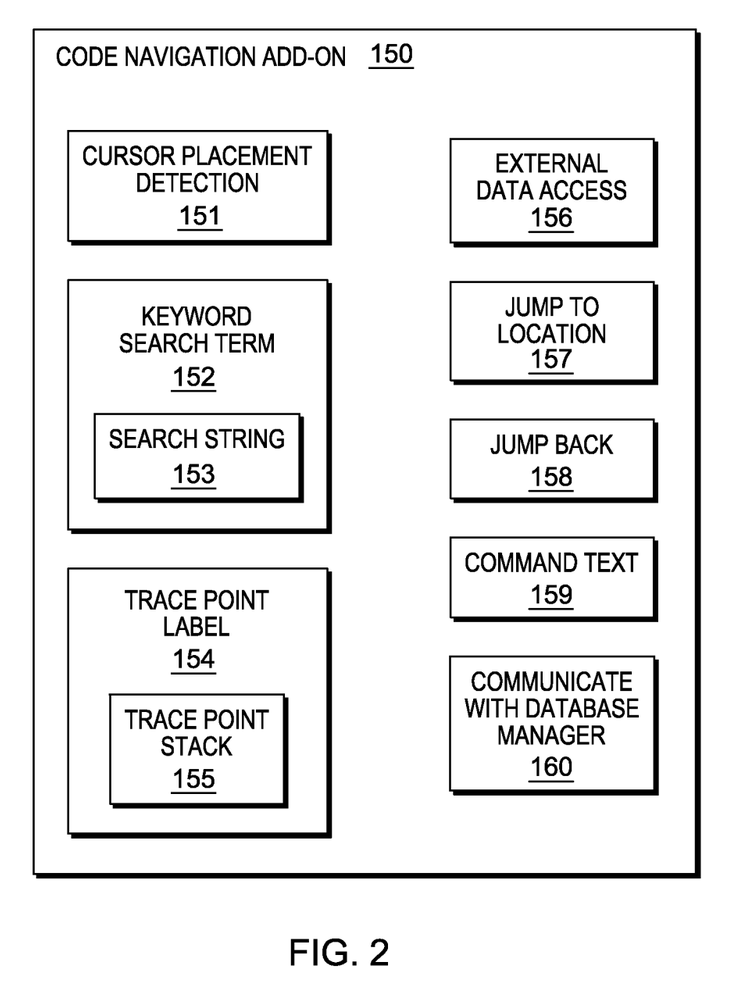
FIG. 2 is a functional block diagram of the code navigation add-on of the code navigation system of FIG. 1, in accordance with an embodiment of the present invention.

FIG. 2 is a functional block diagram of code navigation add-on 150 of code navigation system 100 illustrated in FIG. 1, in accordance with an embodiment of the present invention. Code navigation add-on 150 includes cursor placement detection module 151, keyword search term module 152, trace point label module 154, external data access module 156, jump to location module 157, jump back module 158, command text module 159, and communicate with database manager module 160.

Cursor placement detection module 151 detects the active text insertion or selection position of the text cursor within the source code. Cursor placement detection module 151 returns cursor location information including at least one of the following: (i) line number, (ii) column number, (iii) complete word, or string of characters, on which the cursor is placed, whether at or adjacent to a corresponding character; and (iv) designated non-word location. In some embodiments, cursor placement detection module 151 uses the functionality of code editor 140 to determine the line, column, and/or word, or designated non-word, where the cursor is located.

Cursor placement detection module 151 also returns the cursor location information describing where the cursor is located within the structure of the source code. In some embodiments of the present invention, cursor placement detection module 151 is pre-programmed for various programming languages and the user selects the programming language at the time that code navigation add-on 150 is activated.

Determining cursor placement within the structure of the source code includes identifying the corresponding area and/or division where the cursor is located. For example, for fixed-column COBOL code, cursor placement detection module 151 uses the presence of letters or the lack thereof in certain code columns to determine cursor placement. The cursor may be on a variable name, but the variable name is located in the Procedure Division rather than the Data Division. Cursor placement detection module 151 determines that the cursor is located on a word in the Procedure Division. For another example, the cursor module recognizes cursor placement in an SQL statement while distinguishing whether the cursor is located within an open, fetch, close, or declare statement.

Keyword search term module 152, which includes search string sub-module 153, determines the keyword search term on which action is to be taken. The keyword search term may be the word on which the cursor is placed. However, in some embodiments, the word on which the cursor is placed and the corresponding code division, as identified by cursor placement detection module 151, might indicate a keyword search term other than the word where the cursor is placed.

For COBOL and other programming languages, there usually exists reserved words, also referred to as reserved identifiers, or keywords. These reserved words include, for example, the division names and statement names. Keyword search term module 152 determines what reserved word, if any, is indicated by the cursor location and also establishes the keyword search term, based on the portion of the code where the cursor is located and the reserved word indicated by the cursor placement. Keyword search term module 152 maintains a list of the reserved words so that language-appropriate keywords are used for reference in determining what keyword search term is indicated by the cursor placement. In some embodiments, module 152 maintains a reserved word list for various programming languages.

The keyword search term module further maintains a list of non-word locations that may be associated with the cursor location. The reserved words as well as the non-word locations are associated with corresponding keyword search terms in a keyword table. For example, if the cursor is determined to be located on the command line, a non-word location, the keyword search term will be "procedure" so that a search of the COBOL program will locate the beginning of the procedure division.

Search string sub-module 153 sets the keyword search term, where applicable, in the search string value for the ISPF repeat-find ("rfind") command. In this way, when the keyword search term module moves the cursor to a keyword search term in the source code, the rfind routine will move the cursor to the next instance of the keyword search term. Movement of the cursor is discussed in more detail below.

Trace point label module 154, which includes trace point stack 155, assigns a label to the line in the source code document where cursor placement detection module 151 determines that the cursor is located when the navigation add-on is activated. The label is stored in trace point stack 155 in a linked list, or other data structure, in the order in which it is assigned. In one embodiment, the label is selected from a fixed sequence of numerical or character values available for assignment. A next number or character is assigned each time the navigation add-on is activated. As will be discussed in more detail below, trace point module 154 enables the user to reverse navigate to a previous cursor location.

Jump to location module 157 moves the cursor and the screen display within a source code document to a relevant section of the source code according to a table of predefined actions associated with the current cursor placement. One action may be to move the cursor and scroll the displayed text to display another portion of the source code. Generally, movement of the cursor is based on a keyword search term. For example, if cursor placement detection module 151 detects that the cursor is located on a variable name inside the Data Division, jump to location module 157 places the cursor on the first instance of the variable name within the Procedure Division. As discussed above, when cursor movement is based on a keyword search term, the rfind search string value is also set to the search term, or, in the example, to the variable name, so that when the user presses the rfind function key, the cursor moves to the next instance of the variable name within the Procedure Division.

Jump back module 158 accesses trace point stack 155 to reverse navigate to the previous labeled cursor location within the source code. In a preferred embodiment, the jump back module is activated by pressing a function key, for example, the "F4" key. In one embodiment, jump back module 158 erases the trace point label from trace point stack 155 for each line where the cursor is placed while retracing the movement during code analysis and/or review. In other embodiments, the trace point label remains in trace point stack 155 until the jump to location module is again activated or until a general command issues to erase all trace point labels. Where trace point labels remain in trace point stack 155 during the jump-back operation, the user may also jump forward to cursor locations where trace point labels remain.

External data access module 156 communicates with data sources external to the source code being analyzed to retrieve source code for external data and routines referenced within a coding document. In an exemplary embodiment, external data sources include: database 132, transaction library 170, system catalog tables 134, and copybook library 180. Analysis and review of source code often requires the user to open separate screens to access code referenced by a source code document, but not included in the document. For example, to locate the source of variables in a copybook statement, the user typically browses through the copybook data sets in separate screens. By accessing copybook library 180, as described below, external data access 156 eliminates the need for the user to browse the copybook library in a different program and/or window.

Figure 3:
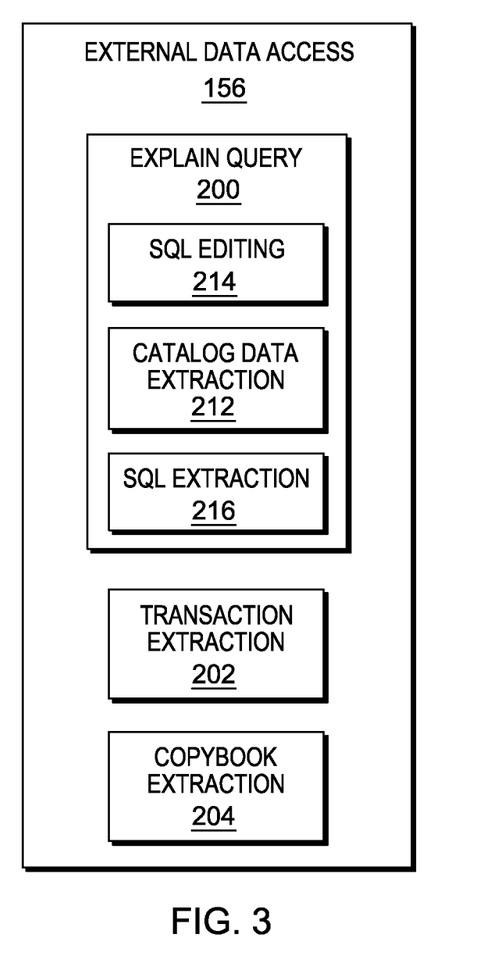
FIG. 3 is a functional block diagram of an external data access module of the code navigation add-on of FIG. 2, in accordance with an embodiment of the present invention.

FIG. 3 is a functional block diagram of external data access module 156 of code navigation add-on 150 illustrated in FIG. 2, in accordance with an embodiment of the present invention. In an exemplary embodiment, external data access module 156 includes EXPLAIN query sub-module 200, transaction extraction sub-module 202, and copybook extraction sub-module 204.

When cursor placement detection module 151 detects cursor placement within an SQL statement block and keyword search term module 152 determines that the word on which the cursor is placed is a table name, external data access module 156 is called which allows the user to see the various characteristics of the table like indexes, etc. EXPLAIN query sub-module 200 is a sub-module of the external data access module, which the user can invoke. The EXPLAIN query sub-module can assist the user with SQL tuning and access path optimization through the execution of an EXPLAIN query. The EXPLAIN query sub-module first executes the EXPLAIN query (which inserts data in system catalog tables 134) and subsequently accesses the catalog table information to display it to the user. The captured information includes the type of scan, the details of indexes used, the I/O technique, the join method, cost estimates, and other useful information. EXPLAIN query sub-module 200 includes system SQL editing sub-module 214, catalog data extraction sub-module 212, and SQL extraction sub-module 216.

EXPLAIN query module 200 provides the facility to perform an on-the-fly EXPLAIN query on embedded SQLs inside source code. For example, SQL extraction sub-module 216 extracts the SQL query from the program, based on identification of the SQL query through keyword search term module 152. SQL editing sub-module 214 edits the SQL query for EXPLAIN processing and instructs database manager 130 to execute this EXPLAIN SQL query in order to populate the system catalog tables 134 with the access path information, and the catalog data extraction module 212 identifies and collates useful information from the system catalog tables as provided by the database manager, such as index type, index columns, and order.

Transaction extraction sub-module 202 accesses transaction library 170 to extract and display transaction coding where a corresponding call to a transaction server is made in the source code. As stated above, the preferred embodiment of the transaction server is a CICS server. When cursor placement detection module 151 determines that the cursor is on an embedded CICS instruction and keyword search term module 152 determines that the cursor is on, for example, the CICS "START" statement, the keyword search term module provides the corresponding transaction name to transaction extraction sub-module 202 so that transaction extraction sub-module 202 can extract the corresponding code from CICS transaction library 170 and display it in the source code through the code editor display.

Copybook extraction sub-module 204 accesses copybook library 180 to eliminate the need for the user to browse the copybooks manually during analysis of source code. In one embodiment of the invention, copybook extraction sub-module 204 responds to the cursor placement detection module 151 determining that the cursor is placed on a copybook name by extracting the copybook routine and displaying it inside the source code where the copybook name is located.

Returning to FIG. 2, command text module 159 provides any actionable text entered on the command line of code editor 140 to external access module 156. Actionable text is any reserved word recognized by the code navigation add-on 150 that may be associated with the cursor location information. For example, the user can enter the term "VALIDATE" on the code editor command line and place the cursor on a subprogram name in a CALL/LINK/XCTL instruction. When the user activates the code navigation add-on 150 with the term "VALIDATE" on the command line, command text module 159 detects that there is command text on the command line and provides the command text "VALIDATE" to external access module 156. It should be noted that command text module 159 may invoke the external access module only when accessing external data is relevant to the cursor context and the command text. In this case, in addition to moving the cursor to the subprogram source code, code navigation add-on 150 can also cross-validate the size and type of the variables passed from the calling program to the subprogram. External access module 156 will notify the user in cases where the variables are found to be out of sync (which usually causes storage exception errors).

For another example, the user enters the term "SIZE" on the editor command line and places the cursor on a variable name inside the Procedure division. In this example, command text module 159 does not require invocation of external data access module 156, so it is not called. Whether or not to call the external data module depends on the context of the cursor and the command text input. In this case, when the user activates code navigation add-on 150 with the term "SIZE" on the command line, the action of displaying the size of the variable in terms of number of bytes will be taken in addition to jump to location module 157 moving the cursor to the variable declaration. Many other functions are possible with code navigation system 100 when command line text is combined with cursor placement.

Communicate with database manager module 160 facilitates communication between code navigation add-on 150 and database manager 130. One example of communication between the code navigation add-on and the database manager is described above, where an EXPLAIN query requires access to and a response from database manager 130.

Figure 4A:
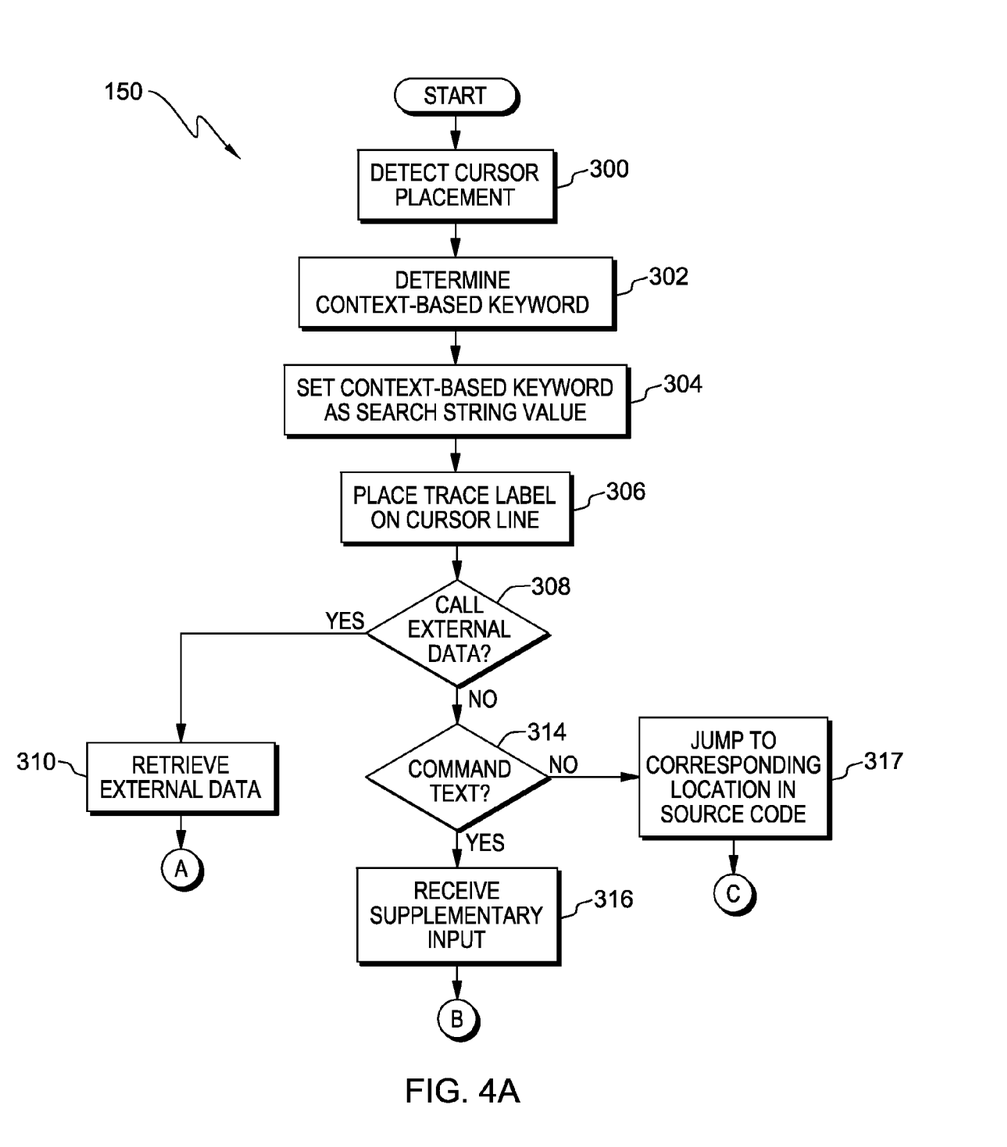
FIGS. 4A and 4B are a flowchart depicting the process flow of the code navigation system illustrated in FIG. 1, in accordance with an embodiment of the present invention.
Figure 4B:
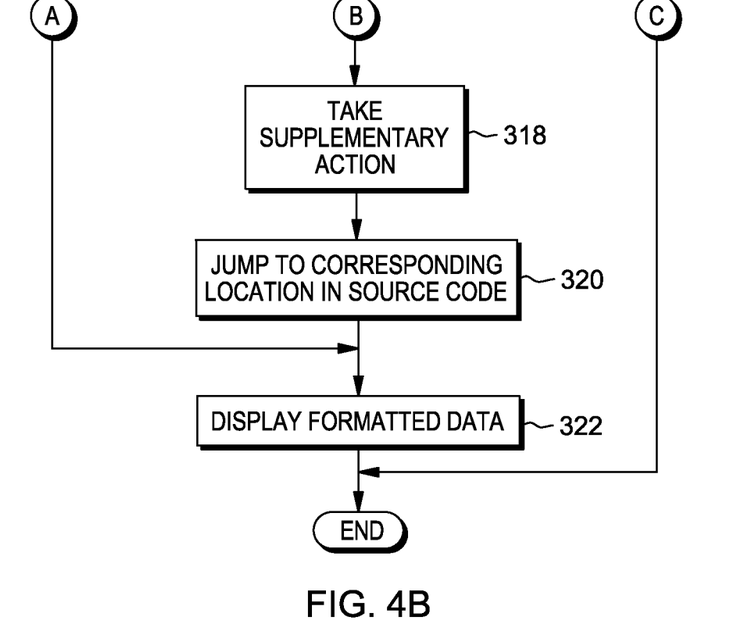

FIGS. 4A and 4B are a flowchart depicting an embodiment of operational steps of code navigation add-on 150 of code navigation system 100 illustrated in FIG. 1, in accordance with embodiments of the present invention. When the program being analyzed, located in coding document store 120, is opened by code editor 140, the code is displayed in editable form, and the operation begins when an initiating action is taken by a user to start code navigation add-on 150, for example, by pressing function key "F6". Cursor placement detection module 151 then detects the cursor placement within the code by returning the line, column, and word where the cursor is located (step 300). Cursor placement detection module 151 also returns the location of the cursor relative to the structure of the program code such as the corresponding area and/or division of the code where the cursor is located.

In step 302, context-based keyword module 152 determines the context-based keyword to be used as a search term. The keyword search term may not be the word on which the cursor is placed, but can be a reserved word for the corresponding programming language. The context based keyword is the search term that is predetermined for a given set of data associated with the cursor location information provided by cursor placement detection module 151. In step 304, context-based keyword module 152 sets the context-based keyword as the search string value for the repeat-find routine.

In step 306, trace point label module 154 places a trace point label on the cursor line for the current cursor location and places the trace label in a data structure for retrieval during reverse navigation. The trace point label is stored in trace point stack 155 in the form of a linked list, or other data structure (step 306).

In decision step 308, external data access module 156 determines if the cursor placement and/or context-based keyword indicates that external data is called. If external data is called (decision step 308, "Y" branch), external data access module retrieves the appropriate external data (step 310). For example, if the cursor placement is determined to be on an SQL statement (see step 300) and the context-based keyword is determined to be a table name (see step 302), external data access module 156 allows the user to see the various characteristics of the table like indexes etc. and EXPLAIN query sub-module 200 may be invoked by the user.

In step 322, external data is displayed within the editable code. For example, if copybook extraction sub-module 204 is called, the copybook routine corresponding to the copybook name on which the cursor is placed is extracted from the copybook library 180 and displayed within the editable text of the program code as displayed by the code editor 140 (step 322). When the external data is extracted and displayed, processing ends until code navigation module 150 is invoked again.

If external data is not called (decision step 308, "N" branch), command text module 159 determines if actionable text is entered at the command line (decision step 314). If no actionable text is entered at the command line (decision step 314, "N" branch), jump to location module 157 moves the cursor and scrolls the displayed lines of code to a relevant section of the source code according to a table of predefined actions (step 317) associated with the detected cursor placement (see step 300) and context-based keyword (see step 302).

If actionable text is entered at the command line (decision step 314, "Y" branch), command text module 159 receives the supplementary input from the command line (step 316) and takes the appropriate supplementary action based on the entered text (step 318). For example, if the text entered at the command line is "SIZE" and the cursor is placed on a variable name inside the procedure division, the size of the variable in terms of bytes will be determined (step 318).

In step 320, jump to location module 157 moves the cursor and scrolls the displayed lines of code to the appropriate keyword search term according to a table of predefined actions associated with the detected cursor placement. Code editor 140 displays the corresponding data within the text of the program code at the cursor location (step 322). After displaying the corresponding data (step 322), processing ends.

Figure 5:
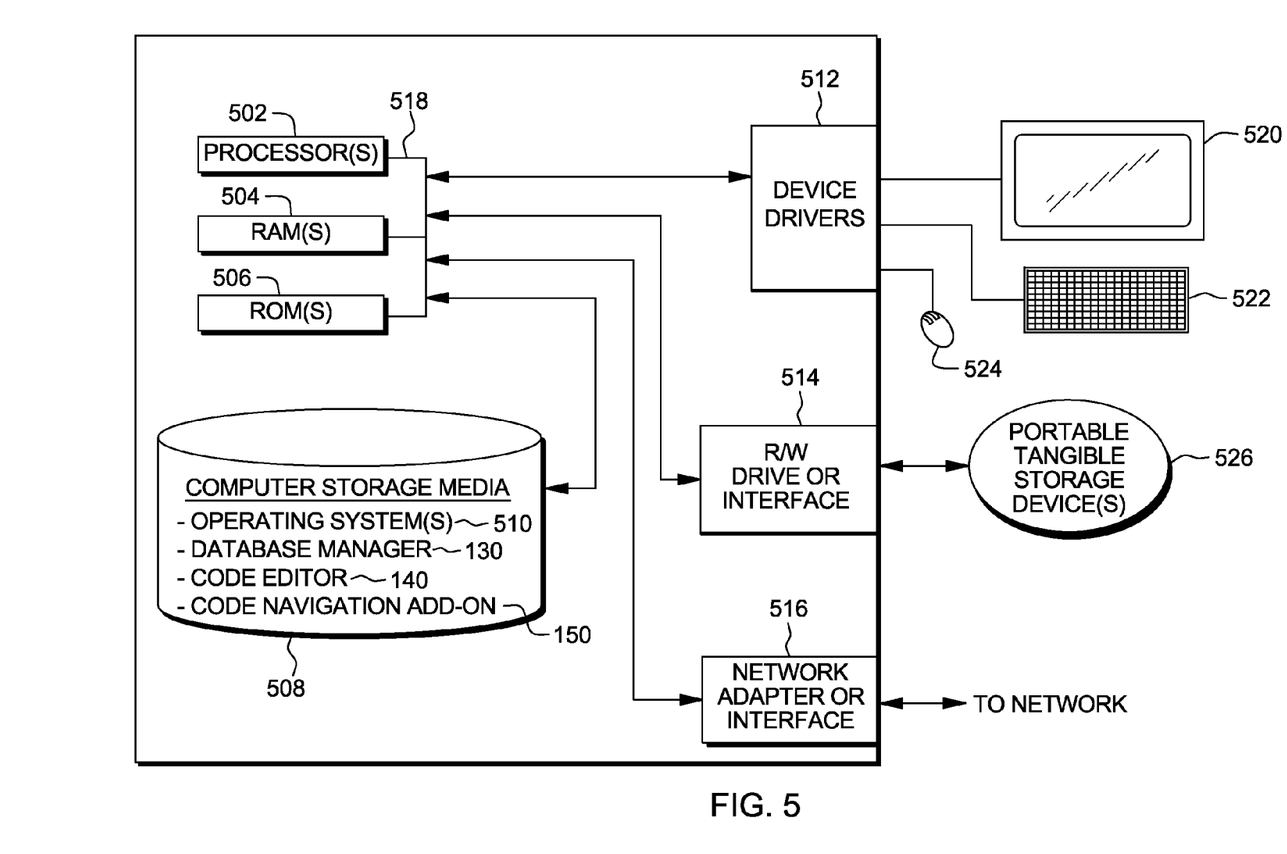
FIG. 5 is a block diagram of components of the computing device of the code navigation system of FIG. 1, in accordance with an embodiment of the present invention.

FIG. 5 depicts a block diagram of components of computing device 110 of code navigation system 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made within the scope and spirit of the invention.

Computing device 110 can include one or more processors 502, one or more computer-readable RAMs 504, one or more computer-readable ROMs 506, one or more computer-readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within a system.

One or more operating systems 510, and database manager 130, code editor 140, and code navigation add-on 150 are stored on one or more of the computer-readable storage media 508 for execution by one or more of the processors 502 via one or more of the respective RAMs 504 (which typically include cache memory). In the illustrated embodiment, each of the computer-readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 can also include a R/W drive or interface 514 to read from and write to one or more portable computer-readable tangible storage devices 526. Database manager 130, code editor 140, and code navigation add-on 150 on computing device 110 can be stored on one or more of the portable computer-readable tangible storage devices 526, read via the respective R/W drive or interface 514 and loaded into the respective computer-readable storage media 508.

Computing device 110 can also include a network adapter or interface 516, such as a TCP/IP adapter card or wireless communication adapter (such as a 4G wireless communication adapter using OFDMA technology). Database management system 130, code editor 140, and code navigation add-on 150 on computing device 110 can be downloaded to the computing device from an external computer or external storage device via a network (for example, the Internet, a local area network or other, wide area network or wireless network) and network adapter or interface 516. From the network adapter or interface 516, the programs are loaded into the computer-readable storage media 508. The network may comprise copper wires, optical fibers, wireless transmission, routers, firewalls, switches, gateway computers and/or edge servers.

Computing device 110 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 can comprise hardware and software (stored in computer-readable storage media 508 and/or ROM 506).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for a presentation control system. However, numerous modifications and substitutions can be made without deviating from the scope of the present invention. Therefore, the present invention has been disclosed by way of example and not limitation.

What is claimed is:

1. A method for navigating programming source code from within a source code editor, the method comprising:
   a computer determining a text cursor location information within the text of the source code document displayed on a display screen;
   the computer identifying a table reserved word according to a programming language;
   the computer determining a jump-to-location action based on the reserved word; and
   the computer taking the jump-to-location action indicated by the reserved word;
   wherein:
   the text cursor location information is based on a text cursor location being within or adjacent to the reserved word;
   the text cursor location information includes the reserved word.

2. The method of claim 1, wherein the text cursor location information is based on a text cursor location being within or adjacent to the reserved word.

3. The method of claim 1, further comprising:
   recording in a data structure a set of cursor location entries associated with each action taken, the set of cursor location entries at least linked in the reverse order to the actions taken;
   identifying a cursor location associated with a previous action taken by reverse navigating the linked list to a previous cursor location entry; and
   moving the cursor to the cursor location associated with the previous cursor location entry.

4. The method of claim 1, further comprising:
   identifying the jump-to-location action corresponding to the reserved word in a keyword table.

5. A computer program product for navigating programming source code from within a source code editor, the computer program product comprising:
   one or more non-transitory computer-readable storage media and program instructions stored on the one or more non-transitory computer-readable storage media, the program instructions comprising:
   program instructions to determine a text cursor location information within the text of the source code document displayed on a display screen;
   program instructions to identify a reserved word according to a programming language;
   program instructions to determine a jump-to-location action based on the reserved word; and
   program instructions to take the jump-to-location action indicated by the reserved word;
   wherein:
   the text cursor location information is based on a text cursor location being within or adjacent to the reserved word;
   the text cursor location information includes the reserved word.

6. The computer program product of claim 5, wherein the text cursor location information is based on the text cursor location being within or adjacent to the reserved word.

7. The computer program product of claim 5, further comprising:
   program instructions to record in a data structure a set of cursor location entries associated with each action taken, the set of cursor location entries at least linked in the reverse order to the actions taken;
   program instructions to identify a cursor location associated with a previous action taken by reverse navigating the linked list to a previous cursor location entry; and
   program instructions to move the cursor to the cursor location associated with the previous cursor location entry.

8. A computer system for navigating programming source code from within a source code editor, the computer system comprising:
   one or more computer processors;
   one or more computer-readable storage media;
   program instructions stored on the computer-readable storage media for execution by at least one of the one or more processors, the program instructions comprising:
   program instructions to determine a text cursor location information within the text of the source code document displayed on a display screen;
   program instructions to identify a reserved word according to a programming language;
   program instructions to determine a jump-to-location action based on the reserved word; and
   program instructions to take the jump-to-location action indicated by the reserved word;
   wherein:
   the text cursor location information is based on a text cursor location being within or adjacent to the reserved word;
   the text cursor location information includes the reserved word.

9. The computer system of claim 8, wherein the text cursor location information is based on a text cursor location being within or adjacent to the reserved word.

10. The computer system of claim 8, further comprising:
   program instructions to record in a data structure a set of cursor location entries associated with each action taken, the set of cursor location entries at least linked in the reverse order to the actions taken;
   program instructions to identify a cursor location associated with a previous action taken by reverse navigating the linked list to a previous cursor location entry; and
   program instructions to move the cursor to the cursor location associated with the previous cursor location entry.

* * * * *